Feb. 15, 1966 V. D. VALADE 3,234,584
PIVOTAL JOINT
Filed Sept. 18, 1962
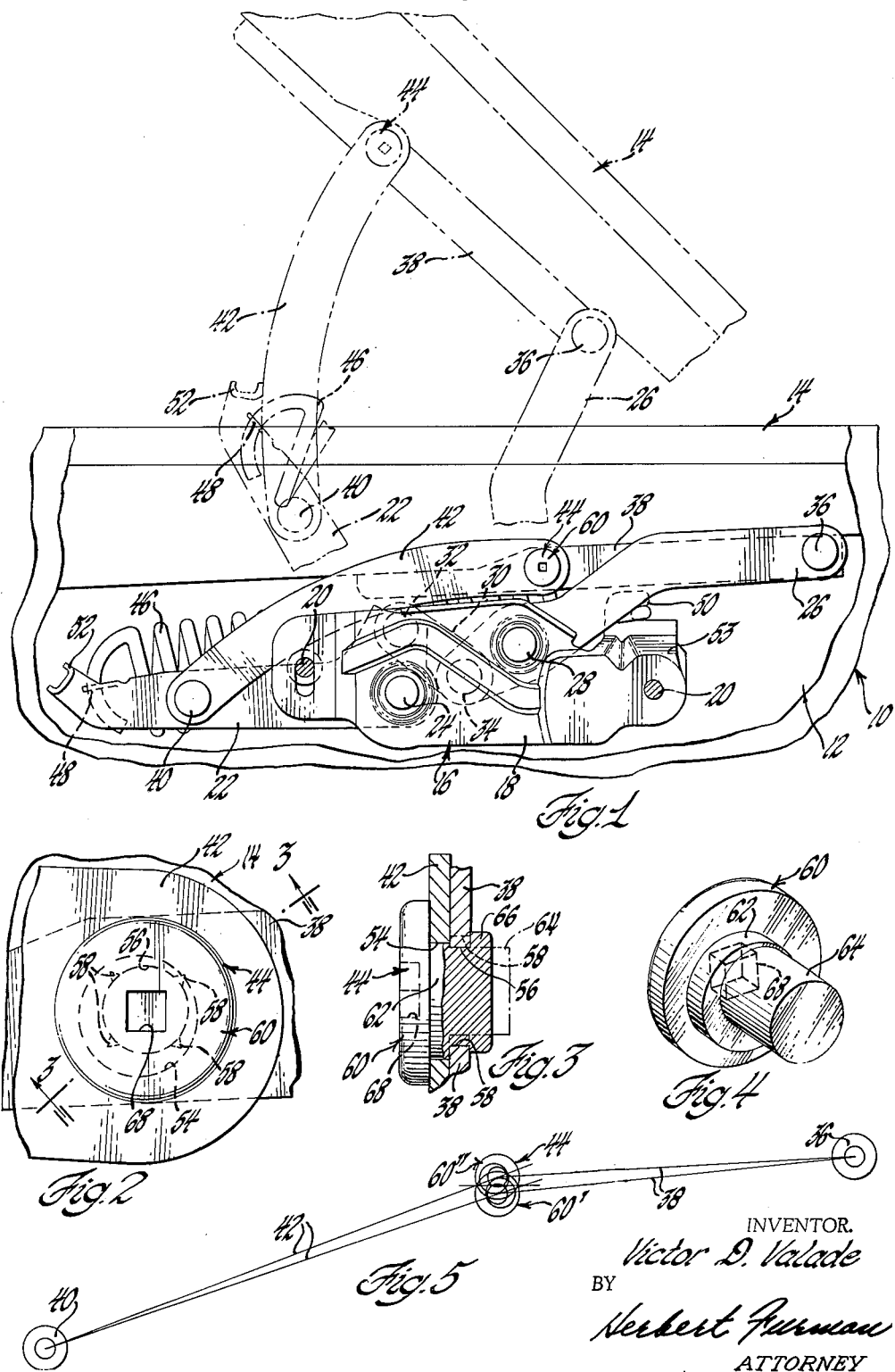
INVENTOR.
*Victor D. Valade*
BY
*Herbert Furman*
ATTORNEY United States Patent Office 3,234,584
Patented Feb. 15, 1966

3,234,584
PIVOTAL JOINT
Victor D. Valade, Orchard Lake, Mich., assignor to General Motors Corporation, Detroit, Mich., a corporation of Delaware
Filed Sept. 18, 1962, Ser. No. 224,312
4 Claims. (Cl. 16—128.1)

This invention relates generally to pivotal joints and more particularly to an improved means and method for fixing the angular relationship of a pair of relatively rotatable apertured members at one relative rotative position thereof.

Vehicle body hoods are often supported on the body for movement between open and closed positions by a pair of spaced extendable and retractable hood hinges. Due to production tolerances and other variations, it is often difficult to ensure that both hinges will have the same retracted position when the hood is in a closed position within the opening of the hood compartment. Very often one of the hinges will have a retracted position which differs from the retracted position of the other hinge so that the hood is distorted as it is moved to a fully closed position within the opening of the hood compartment. The pivotal joint of this invention permits each hinge to be preset during the manufacture thereof so that the retracted positions of the hinges are the same in all instances.

In the preferred embodiment of the invention, the pivotal joint is used to connect a hood hinge control link to a support bracket which connects the hood to the hinge. During the manufacture of the hinge, the hinge is assembled except for the one pivotal connection, and then the hinge is placed in a jig or fixture which duplicates the exact desired retracted position of the hinge in the vehicle body. A rivet or connecting member is inserted through the apertures in the connecting link and support bracket, with this connecting member having an eccentric body portion journaled within the aperture of the control member and a non-eccentric shank portion journaled within the aperture of the support bracket. The control link and bracket are then located in the desired angular relationship by rotating the connecting member. The shank portion is then headed over to lock it into position by causing the shank portion to flow into grooves or serrations opening to the aperture of the support bracket. Thus, the connecting member is fixed to the support bracket and the control link rotates about the eccentric portion thereof. While it is preferable that the angular relationship or position of the control link and support bracket be fixed in the retracted position of the hinge since most difficulties occur at this position, the angular relationship or position of the control link and support bracket may be alternately fixed in the extended position of the hinge if so desired.

The primary object of this invention is to provide an improved pivotal joint. Another object of this invention is to provide an improved pivotal joint for fixing the angular relationship of a pair of relatively rotatable apertured members at one relative rotative position thereof. A further object of this invention is to provide an improved method of fixing the angular relationship of a pair of relatively rotatable apertured members at one relative rotative position thereof.

These and other objects of this invention will be readily apparent from the following specification and drawing wherein:

FIGURE 1 is a partially broken away partial side elevational view of a vehicle body having a hood mounted thereon for movement between open and closed positions by a hood hinge embodying a pivotal joint acording to this invention;

FIGURE 2 is an enlarged view of a portion of FIGURE 1;

FIGURE 3 is a sectional view taken generally along the plane indicated by line 3—3 of FIGURE 2;

FIGURE 4 is a perspective view of the rivet or connecting member, and

FIGURE 5 is a schematic.

Referring now particularly to FIGURE 1 of the drawing, a vehicle body 10 includes a body or hood compartment 12 which is opened and closed by a hood 14. The hood 14 is mounted on the body 10 for movement between open and closed positions by a pair of like hood hinges 16, only one being shown, with hinges 16 being located adjacent each of the rear corners of the hood 14 and being aligned transversely of the body.

The hinge 16 is of known construction and generally comprises a body mounted bracket 18 which is bolted or otherwise secured at 20 to the side wall of the compartment 12. A forwardly disposed bellcrank lever 22 is pivotally secured at 24 to the bracket 18, and a rearwardly disposed offset lever 26 is pivotally secured at 28 to the bracket 18. Swinging movement of the levers 22 and 26 relative to each other and to the bracket 18 is controlled by a control link 30 pivoted at 32 to the lever 22 and at 34 to the lever 26. The rearward end of lever 26 is pivotally secured at 36 to a hood mounted bracket 38 and the lever 22, adjacent the forward end thereof, is pivoted at 40 to one end of a control member or link 42 the other end of which is pivoted at 44 to the bracket 38 by a pivotal joint according to this invention. A coil tension spring 46 has the forward end thereof hooked over a tab 48 of lever 22 and the rearward end thereof hooked over a tab 50 of bracket 18 to counterbalance the hood 14 as it moves between open and closed positions.

Hinge 16 is shown in full lines in the retracted position thereof and closed position of hood 14, and the extended position of the hinge and open position of the hood are partially indicated by dot-dash lines. Generally, the lever 22 swings clockwise about the pivot 24 as the lever 26 swings counterclockwise about the pivot 28, with movement of the levers being controlled and coordinated by the link 30, to shift the hood 14 forwardly and upwardly of the body as the link or control member 42 swings counterclockwise about the pivot 40. The extended position of the hinge 16 is fixed by the engagement of the link 42 with the bent end 52 of lever 22, and the retracted position of the hinge 16 is fixed by the engagement of the lever 26 with the flange 53 of bracket 18.

Since a pair of hood hinges are provided, it is possible for one of the hinges to have a retracted position which differs sufficiently from the retracted position of the other hinge 16 so that the hinges are not transversely aligned with respect to each other when the hood 14 is in its closed position. Thus, one edge portion of the hood will not be normally aligned with the other edge portion of the hood and the edge portions can only be aligned by distorting the hood. The flexure of the hood to permit this distortion is undesirable.

The pivotal joint 44 of this invention permits the hinges to be preset during the manufacture thereof so that both hinges have the same retracted position and to prevent any distortion of the hood when the hinges are mounted on the body. Referring now particularly to FIGURES 2 through 4 of the drawing, the upper end of the control member or link 42 is provided with an aperture 54 and the forward end of the bracket 38 is provided with a somewhat smaller aperture 56. A plurality of grooves or serrations 58, preferably four in number, open to the aperture 56. A rivet or connecting member 60 includes an eccentric body portion 62 journaled within the aperture 54 and a non-eccentric shank portion 64 which is received within the aperture 56 and is thereafter headed over at 66 to force the material of the shank portion into the grooves or serrations 58 and thereby fix the member 60 to the bracket 38.

During the manufacture of the hinge 16, the hinge is completely assembled except for the pivot 44 and the hinge is then placed in a suitable jig or fixture which duplicates the exact desired retracted position of the hinge. The rivet 60 is then inserted through the substantially aligned apertures 54 and 56. Thereafter, a suitable tool is inserted in a socket 68 provided in the rivet 60 and the rivet 60 is rotated until the link 42 and the bracket 38 are located in the desired angular position or relationship with respect to each other. The shank portion 64 of the rivet 60 is then headed over at 66 so as to fix the position of the rivet 60 with respect to the bracket 38 and in turn fix the rotative position of the bracket 38 and link 42 relative to each other in the retracted position of the hinge 16.

The schematic of FIGURE 5 illustrates the manner in which the member 42 and bracket 38 may be adjusted to the desired angular position or relationship with respect to each other. The lines indicate lines through the respective axes of pivot 36 and aperture 56 of bracket 38 and pivot 40 and aperture 54 of link 42. It can be seen that if the rivet 60 is rotated from the position 60' to the position 60", the angular relationship of the bracket 38 and link 42 will be decreased, and likewise, if the rivet 60 is rotated from the position 60" to the position 60', the angular relationship of the bracket 38 and link 42 will be increased. Thus, rotation of the rivet 60 in either direction will rotate the bracket 38 and link 42 about their respective pivots 36 and 40 to move them relative to each other until they are located in the desired angular position or relationship in the retracted position of the hinge and closed position of the hood. Thus, each hinge 16 may be preset to thereby avoid distortion of the hood 14 upon movement thereof to closed position.

Thus, this invention provides an improved pivotal joint.

What is claimed is:

1. A hinge for supporting a vehicle body closure member on a vehicle body for movement between open and closed positions comprising, a pair of lever arms swingably supported on said body, first means pivotally connecting one of said arms to said closure member, a control member, second means pivotally connecting one end of said control member to the other of said arms, third means pivotally connecting the other end of said control member to said closure member and including a first portion adapted to be fixed within an aperture in one of said members and a second portion eccentrically located with respect to said first portion and adapted to be rotated within an aperture in the other of said members, and means pivotally interconnecting the said arms, said third means second portion being rotatable a desired amount to determine the included angle between a line through said first and third means and a line through said second and third means in one position of said closure member and said third means first portion thereafter being fixed within the aperture there associated to fix the said angle for said one position.

2. A hinge as recited in claim 1 wherein said third means includes a headed connecting member having the shank thereof fixed within an aperture in said closure member and an eccentrically located body portion thereof rotatably mounted within an aperture of said control member.

3. A hinge as recited in claim 1 wherein the aperture associated with said third means first portion includes a plurality of grooves opening thereto and said third means first portion is deformed to force the material thereof into said grooves to fix said first portion within said aperture.

4. A hinge as recited in claim 1 wherein said third means includes a headed connecting member having the shank portion thereof received within an aperture in said closure member and an eccentrically located body portion thereof received within an aperture in said control member, said closure member including a plurality of grooves opening to the aperture therein, and said connecting member shank being deformed to force the material thereof into said grooves and thereby secure said connecting member to said closure member.

References Cited by the Examiner

UNITED STATES PATENTS

| | | | |
|---|---|---|---|
| 908,738 | 1/1909 | Broughton. | |
| 1,979,686 | 11/1934 | Hall et al. | 85—37 |
| 2,163,016 | 6/1939 | Barker | 24—141 X |
| 2,668,320 | 2/1954 | Lustig | 180—69 X |
| 2,698,957 | 1/1955 | Vigmostad | 16—128.1 |
| 2,958,230 | 11/1960 | Haroldson | 85—37 X |
| 2,994,907 | 8/1961 | Hammond | 16—128.1 |
| 3,011,209 | 12/1961 | Majeske | 16—105 |
| 3,120,281 | 2/1964 | Peveler et al. | 74—571 X |

JOSEPH D. SEERS, *Primary Examiner.*

DONLEY J. STOCKING, *Examiner.*